Sept. 18, 1951  L. B. LYNN  2,568,402
VEHICLE STABILIZING APPARATUS
Filed Oct. 19, 1945  3 Sheets-Sheet 1

WITNESSES:
E. A. M'Closkey

INVENTOR
Lawrence B. Lynn.
BY
Paul E. Friedemann
ATTORNEY

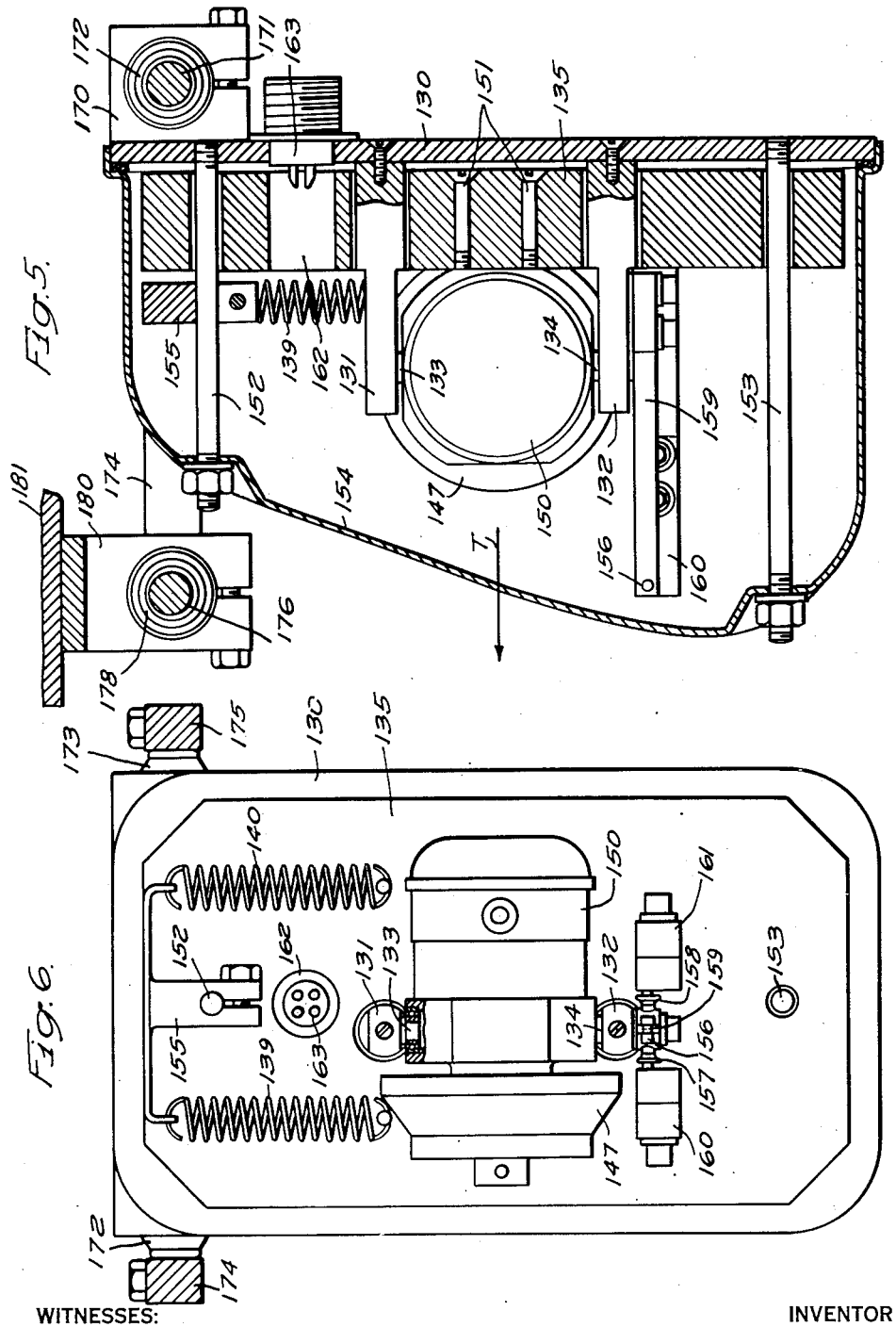

Sept. 18, 1951 L. B. LYNN 2,568,402
VEHICLE STABILIZING APPARATUS
Filed Oct. 19, 1945 3 Sheets-Sheet 3
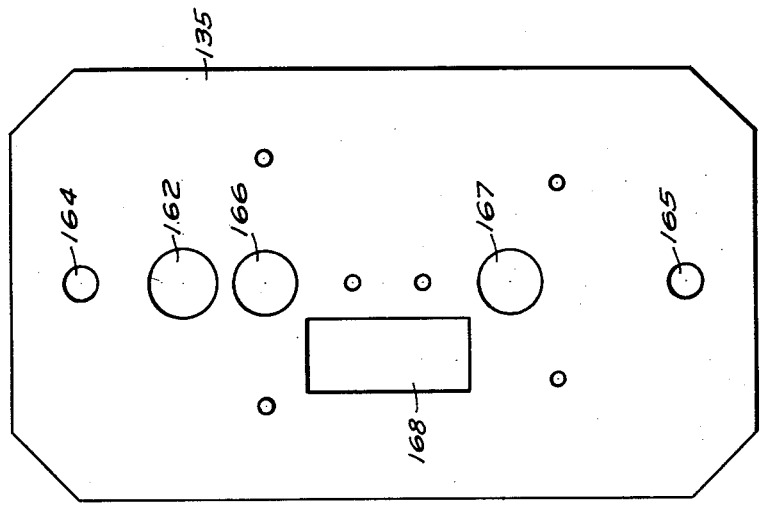
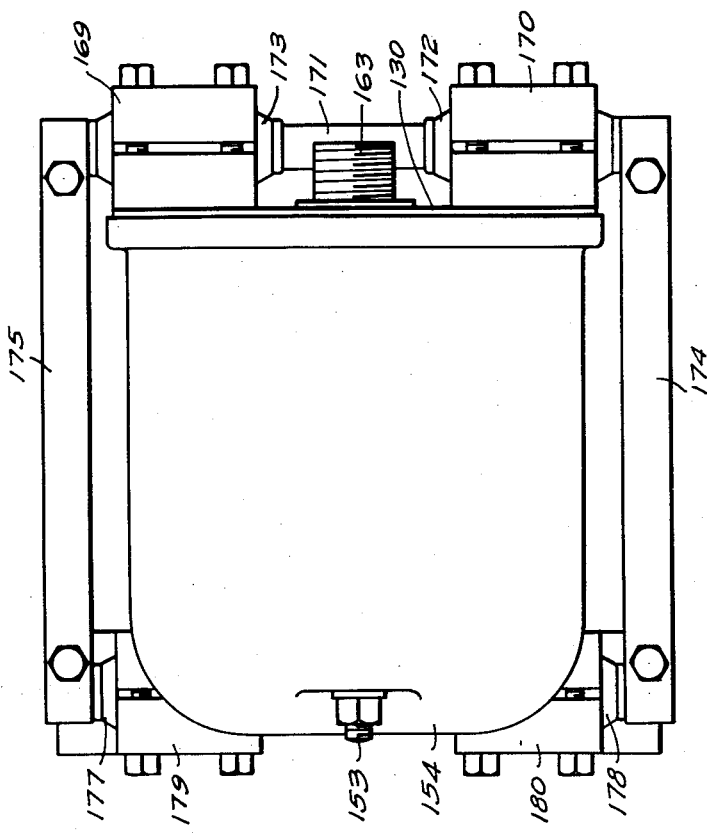
WITNESSES:
E. A. M°Closkey.
INVENTOR
Lawrence B. Lynn.
BY
Paul E. Friedemann
ATTORNEY Patented Sept. 18, 1951

2,568,402

UNITED STATES PATENT OFFICE 2,568,402

VEHICLE STABILIZING APPARATUS

Lawrence B. Lynn, Pittsburgh, Pa., assignor to Westinghouse Electric Corporation, East Pittsburgh, Pa., a corporation of Pennsylvania Application October 19, 1945, Serial No. 623,369

5 Claims. (Cl. 200—52)

My invention relates to ride stabilizing apparatus for conveyances in general, and in one of its specific aspects to apparatus for correcting the tilt, banking or lateral sway of rail vehicles.

Railway tracks are normally banked inwardly on curved track sections. For a car running over the curved track, only the one angle of bank is correct at which the resultant of lateral acceleration and earth's acceleration is normal to the floor of the car body. Since the track banking is fixed while the train speeds vary, this condition of correct bank is rarely obtained.

It is an object of my invention to improve the stability of travel and the riding comfort of vehicles, especially railway passenger cars, by tilting the car body relative to the track so as to place the body into a substantially correct angle of bank.

Another object of the invention is to provide stabilizing means generally capable of minimizing the tendency of vehicles to sway, tilt, or oscillate transversely of their path of travel.

It is also an object of my invention to devise ride stabilizing apparatus that functions with little or no tendency to overshoot or hunt, thus securing an approximately aperiodic or deadbeat stabilizing performance.

These and other objects, as well as the means for achieving them in accordance with the features of my invention, will be apparent from the following description in conjunction with the drawings, in which.

Figure 1:
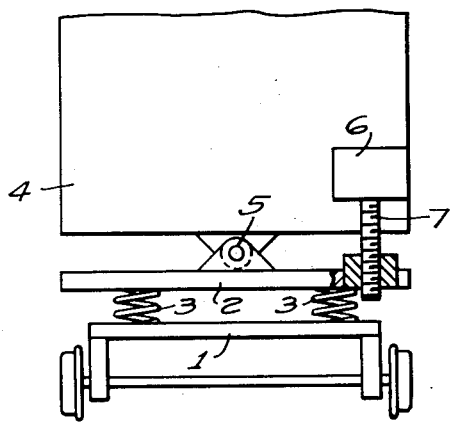
Figure 1 is an explanatory and schematic illustration showing part of a rail vehicle equipped with tilt-correcting apparatus according to the invention.
Figure 2:
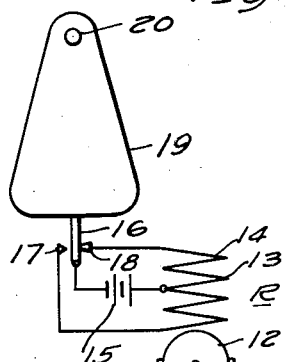
Fig. 2 is a circuit diagram of the electric drive and control means appertaining to the same tilt-correcting apparatus.
Figure 3:
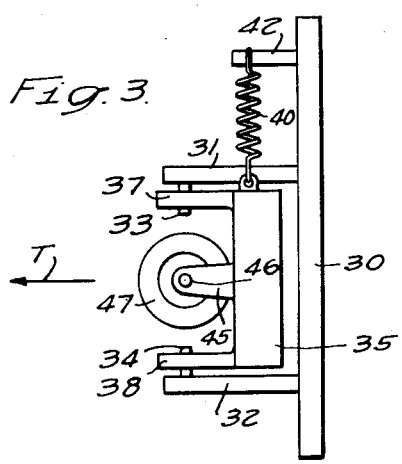
Figure 4:
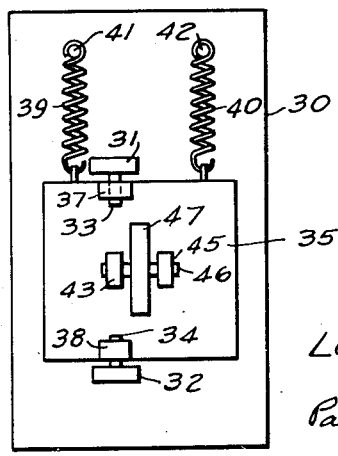

Figs. 3 and 4 show schematically two respective views, at a right-angle to each other, of a device applicable in tilt-correcting apparatus as represented by Figs. 1 and 2; and Figs. 5 to 8 illustrate more in detail an embodiment and construction of a pilot device designed in accordance with the principles of the schemes shown in Figs. 3 and 4; more specifically, Fig. 5 is a sectional view of the pilot device, Fig. 6 a top view with the cover removed, Fig. 7 is a bottom view, and Fig. 8 shows a plate-shaped pendulous member which forms part of the device.

Referring to Figure 1, it should be understood that this illustration does not purport to represent the actual structural design of a railway vehicle, but shows only some parts of the vehicle in a schematic manner, in order to elucidate the operating principle involved in the present invention. According to Fig. 1, the wheel base or truck 1 carries a frame structure 2 on springs 3. The structure 2, in turn, serves as a support for the vehicle body 4. The body is capable of angular motion relative to the support 2 about an axis which is schematically represented at 5 as a pivot bearing, although it will be understood that other types of connections are applicable, provided they permit an angular motion between the support 2 and the body 4. A reversible drive motor 6 is mounted on the body 4 and actuates a jackscrew 7. This screw engages a threaded member 8 which is mounted on the structure 2. A pivot connection may be provided between the member 8 and the structure 2, or between the motor 6 and the body 4. The motor and jackscrew device form part of the tilt-correcting or stabilizing system according to the invention. This system operates to control the motor 6 in order to revolve the jackscrew 7 in one or the other direction, thereby tilting the body 4 relative to the structure 2 for the purpose of counterbalancing a lateral sway motion of the body or an incorrect banking of the body during curved travel of the vehicle.

The motor 6 may be of any suitable mechanical, hydraulical, or electrical type, an electric motor being chosen in the diagram of Fig. 2 for elucidating the present invention.

According to Fig. 2, the motor 6 for driving the jackscrew 7 is energized by reversible voltage from the armature 9 of a generator G. The occurrence and polarity of generated voltage is controlled by a separately excited field winding 10, while the armature is driven at constant speed by an auxiliary motor 11 which drives also the armature 12 of a regulating generator R. The excitation imposed on the generator field winding 10 is controlled by two oppositely acting field windings 13 and 14 of the regulating generator R, which receive excitation from a suitable direct-current source schematically represented at 15. The circuits of field windings 13 and 14 are controlled by a contact device which has an intermediate contact 16 engageable with two contacts 17 and 18. Contact 16 is mounted on a pendulous member 19 pivoted about a pin 20. The pivot pin 20 and the two contacts 17 and 18 are mounted on the body 4 (Fig. 1) of the vehicle so that the pin 20 extends horizontally in parallel to the traveling direction, in order to permit the pendulous member 19 to swing in a vertical plane transverse to the direction of travel when the car body 4 is subjected to swaying or tilting motion.

When the vehicle travels under steady conditions so that the floor of the car body 4 remains horizontal, the pendulous member 19 is in the illustrated zero position in which the contact 16 assumes an intermediate position between contacts 17 and 18. If the car enters a curved section of track and assumes a wrong angle of bank, the pendulous member 19 deflects angularly about pivot pin 20 relative to the car body so that contact 16 engages one of contacts 17 and 18, a very slight deflection being sufficient to establish such a contact engagement. As a result, one of field windings 13 and 14 is energized and causes the armature 12 to generate a voltage of the polarity required to induce in armature 9 an amplified voltage which causes the motor 6 to turn the jackscrew in the direction required for counterbalancing the tilt by imposing an angular motion of the opposite direction on the car body relative to the supporting structure 2.

It should be understood that the sensing means, shown in the explanatory circuit diagram of Fig. 2 merely as a pendulum, consists in reality of a combination of a pendulous mass with a velocity gyroscope as explained presently with reference to Figs. 3 and 4.

According to Figs. 3 and 4, a base plate 30 to be mounted on the vehicle body is provided with two standards 31 and 32, each carrying a pivot pin 33 or 34. A pendulous member 35 has two arms 37 and 38 which are journaled about the pins 33 and 34, respectively. Two helical extension springs 39 and 40 are suspended from studs 41 and 42, respectively, and are attached to the member 35 so that the weight of the member is substantially counterbalanced by the springs when the pivot axis of the pendulous member is in the vertical or zero position as shown in Figs. 3 and 4. Two supports 43 and 45 firmly secured to member 35 contain the bearings for the shaft 46 of a gyroscopic rotor 47. The pivot axis of member 35 is identical with the precession axis of the gyroscope and determined by the geometric axis of the pivot pins 33 and 34. The spin axis of the gyroscope rotor, determined by the geometric axis of shaft 46, extends at a right-angle to the axis of pins 33 and 34 and intersects the latter axis. The sway axis of the gyroscopic system is determined by the geometric axis of the pivot point (5 in Fig. 1) of the car body to which the base plate 30 is attached. The direction of travel is indicated in Fig. 3 by the arrow T. The contacts, or other control elements operated in dependence upon the occurrence of a deflection of member 35 about its pivot axis, are not shown in Figs. 3 and 4; they operate in the manner explained above in conjunction with Fig. 2 and will be described in detail in a later place.

When the base plate 30 of a pilot device designed according to the principles of Figs. 3 and 4 is tilted toward or away from the observer relative to Fig. 3, or in the plane of illustration of Fig. 4, the pendulous member 35 is caused to swing about its pivot axis. The deflection of member 35 is utilized to control the tilt-correcting device, as explained above in conjunction with Fig. 2. The angular velocity of the car body about the sway axis (5 in Fig. 1) is impressed on the gyroscopic system which develops a precessional torque about pins 33 and 34 in opposition to the deflection of member 35. This precessional torque acts as a damping effect and prevents an overtravel of the car body as it reaches the correct angular position. Due to the fact that the weight of member 35 is largely counterbalanced by springs 39 and 40, the stress imposed on the pivot suspension or bearings of the pendulous member is reduced to a minimum.

A pilot device according to the invention, built in accordance with the principles involved in Figs. 3 and 4, is represented in detail by Figs. 5 to 8. The base plate 130 of the illustrated pilot device carries two rigid standards, 131 and 132, which are provided with pivot pins 133 and 134, respectively (Fig. 6). The pendulous member has a plate-shaped portion 135 (Figs. 5, 6 and 8) and carries the housing 150 of an electric motor whose shaft carries the gyroscope rotor 147. The motor housing 150 is firmly secured to the plate portion 135 by means of screws 151 (Fig. 5) and is journaled on pivot pins 133 and 134 by means of ball bearings. Consequently, the member 135 and the motor housing 150 attached thereto form together a pendulous mass capable of angular deflection about the pivot axis of pins 133 and 134, and the spin axis of rotor 147 intersects the pivot axis at a right-angle, as in the schematic diagrams of Figs. 3 and 4. Two supporting studs 152 and 153 are screwed into the base plate 130 and serve to fasten a cover 154. The stud 152 carries a bracket 155 from which two springs 139 and 140 are suspended. The other ends of these springs engage two respective pins (Fig. 6) of the pendulous member 135, in order to counterbalance the total weight of the assembly pivoted on the ball bearings of pivot pins 133 and 134.

An intermediate contact 156 cooperates with two exterior contacts 157 and 158, in order to perform the control function explained above in conjunction with Fig. 2. According to Figs. 5 and 6, the intermediate contact 156 is mounted on a holder 159 which is attached to the standard 132, and hence remains stationary relative to the base plate 130. The two exterior contacts 157 and 158 are mounted on supports 160 and 161, respectively, which are rigidly attached to the pendulous member 135. Hence, when the pendulous member is caused to pivot about the pins 133 and 134 (Fig. 6), the intermediate contact 156 will engage one or the other of contacts 157 and 158, depending upon the direction of the pivotal deflection. Since the gyroscope rotor has merely a corrective function, as compared with the fact that the main control function is due to the pendulous movement of the member 135, the rotor body is of much smaller size and mass than the member 135, as is apparent from the drawings.

The member 135 is provided with an opening 162 and the base plate 130 carries an electric outlet 163 in registry with the opening 162, in order to permit the gyroscope motor to be coupled by a flexible connection (not shown) through opening 162 with the outlet 163. Further openings 164, 165, 166 and 167 in member 135 (Fig. 8) are provided so that the member is normally clear of the standards 131, 132 and studs 152, 153. Thus, the member is permitted to perform a limited angular deflection about its pivot axis, this deflection being sufficient for controlling the engagement between the contacts 156 and 157 or 158. The groove 168 in the surface of member 135 (Fig. 8) is dimensioned to provide the required clearance between the member and the gyroscope rotor 147.

The direction of travel is indicated in Fig. 5 by the arrow T. The control performance of the pivot device is in accordance with the operating principle explained above.

In the illustrated embodiment, the base plate 130 of the stabilizing pivot device is not directly attached to the vehicle body to be stabilized, but is suspended therefrom by means of a pivot or swing link structure which offers to the pilot device proper a degree of freedom in those directions in which the stabilizing system, to be controlled by the pilot device, is ineffective while imparting to the pilot device all deflections that occur within the vertical plane in which the stabilization is to be effected. According to Figs. 5, 6 and 7, the base plate 130 is provided with two aligned clamping structures 169 and 170 which are mounted on a normally horizontal shaft 171, two rubber sleeves 172 and 173, respectively, being interposed between the shaft and the two clamping structures. The shaft 171 is attached to two swing arms 174 and 175 whose other ends are mounted on a shaft 176 which carries two rubber sleeves 177 and 178. Two supporting structures 179 and 180 are clamped onto the respective rubber sleeves 177 and 178 and are both mounted on a panel 181, or wall, of the vehicle body.

By virtue of this swing link structure and due to the elasticity and damping inherent in the rubber sleeve supports, vertical up and down movements of the car body are not directly imparted to the pilot device. Similarly, the effects of acceleration and deceleration in the traveling direction are damped or virtually eliminated as to their possible effects on the control performance on the pilot device proper. However, the swing link structure is rigid in the tilting direction, i. e. with respect to angular deflections in the plane of illustration of Fig. 6, so that a lateral sway or tilt motion of the car body is directly imparted to the pilot device in order to initiate the above explained counterbalancing correction.

While I have shown an electrically operating stabilizing system, it will be understood that, when using a hydraulic system, the deflection of the pendulous member may serve to actuate hydraulic valves instead of, or by means of, the electric contacts.

It will further be understood that the vehicle may be equipped with other stabilizing or shock-absorbing apparatus for eliminating or damping vertical vibrations or deflections. The principles of my swing link suspension can be employed to advantage for such other stabilizing devices in order to render the appertaining pilot equipment less sensitive or insensitive to oscillations or deflections in planes other than the one in which the stabilizing system is intended to have a correcting effect. It thus will be recognized that embodiments and modifications other than those specifically illustrated and described above are possible within the principles and gist of the invention, and without departure from the essential features set forth in the claims attached hereto.

I claim as my invention:

1. A pilot device for vehicle tilt correction, comprising a supporting base designed to be mounted on a vehicle and having pivot means defining a normally vertical pivot axis in the mounted condition of said base, a pendulous mass member journaled to said base by said pivot means and having a center of gravity horizontally spaced from said pivot axis so as to perform an angular deflection about said axis when said base and hence said axis are subjected to tilting movement, a gyroscopic rotor journaled on said member and having a spin axis of a fixed position relative to said member, said spin axis extending normally in a horizontal direction in parallel to the plane of said tilting movement so that said rotor causes a precessional torque to be imposed on said member about said pivot axis due, and in opposition, to said angular deflection, and control means having relatively movable parts on said base and said member respectively to be controlled in dependence upon said deflection.

2. A pilot device for vehicle tilt correction, comprising a supporting base designed to be mounted on a vehicle and having pivot means defining a normally vertical pivot axis in the mounted condition of said base, a pendulous mass member journaled to said base by said pivot means and having a center of gravity horizontally spaced from said pivot axis so as to perform an angular deflection about said axis when said base and hence said axis are subjected to tilting movement, spring means disposed between said base and said member to oppose the gravity component of said member in the direction of said pivot axis, a gyroscopic rotor journaled on said member and having a spin axis of a fixed position relative to said member, said spin axis extending normally in a horizontal direction in parallel to the plane of said tilting movement so that said rotor causes a precessional torque to be imposed on said member about said pivot axis due, and in opposition, to said angular deflection, and relatively movable control means disposed on said base and said member respectively to be controlled in dependence upon said deflection.

3. A pilot device for vehicle tilt correction, comprising a base designed for being mounted on a vehicle and having pivot means defining a normally vertical pivot axis in mounted condition of said base, a pendulous mass member journaled to said base by said pivot means and having a center of gravity horizontally spaced from said pivot axis so that said axis, in mounted condition of said base, is displaced in the vehicle traveling direction from the center of gravity of said member, said member being capable of angular deflection about said axis due to tilting movement of said base transverse to said direction, a gyroscopic rotor journaled on said member and having a spin axis of a fixed position relative to said member, said spin axis extending normally in a horizontal direction in parallel to the plane of said tilting movement so that said rotor causes a precessional torque to be imposed on said member about said pivot axis due, and in opposition, to said angular deflection, and relatively movable control means on said base and said member respectively to be controlled in dependence upon said deflection.

4. A pilot device for tilt correction, comprising a base having pivot means with a normally vertical pivot axis, a pendulum member journalled on said pivot means and having a center of gravity horizontally spaced from said axis to perform angular deflection about said axis when said base and axis are tilted, a gyroscope rotor journalled on said member and having a spin axis extending normally horizontally in a fixed relation to said member and intersecting said pivot axis, and mutually engageable control means on said base and on said member respectively to be controlled by said deflection.

5. A pilot device for tilt correction, comprising a base having pivot means with a normally vertical pivot axis, a pendulum member journalled on said pivot means and having a center of gravity horizontally spaced from said axis to perform angular deflection about said axis when said base and axis are tilted, a gyroscope rotor journalled on said member and having a spin axis extending normally horizontally in a fixed relation to said member and intersecting said pivot axis, said rotor having a smaller mass than said member, spring means disposed between said member and said base and having an upwardly directed spring force counteracting the weight of said member, and mutually engageable control means on said base and on said member respectively to be controlled by said deflection.

LAWRENCE B. LYNN.

REFERENCES CITED

The following references are of record in the file of this patent:

UNITED STATES PATENTS

| Number | Name | Date |
| --- | --- | --- |
| 1,102,515 | Jones | July 7, 1914 |
| 1,559,566 | Farrell et al. | Nov. 3, 1925 |
| 1,924,339 | Weber | Aug. 29, 1933 |
| 1,936,518 | McColm | Nov. 21, 1933 |
| 2,095,677 | Schoepf et al. | Oct. 12, 1937 |
| 2,110,809 | Murphy | Mar. 8, 1938 |
| 2,174,997 | Ronk | Oct. 3, 1939 |
| 2,247,749 | DeVenel | July 1, 1941 |
| 2,353,503 | Rost et al. | July 11, 1944 |